Jan. 27, 1925.                                                          1,524,339
                          W. A. CLEGHORN
                             TRUCK
                        Filed Feb. 27, 1924            3 Sheets-Sheet 1
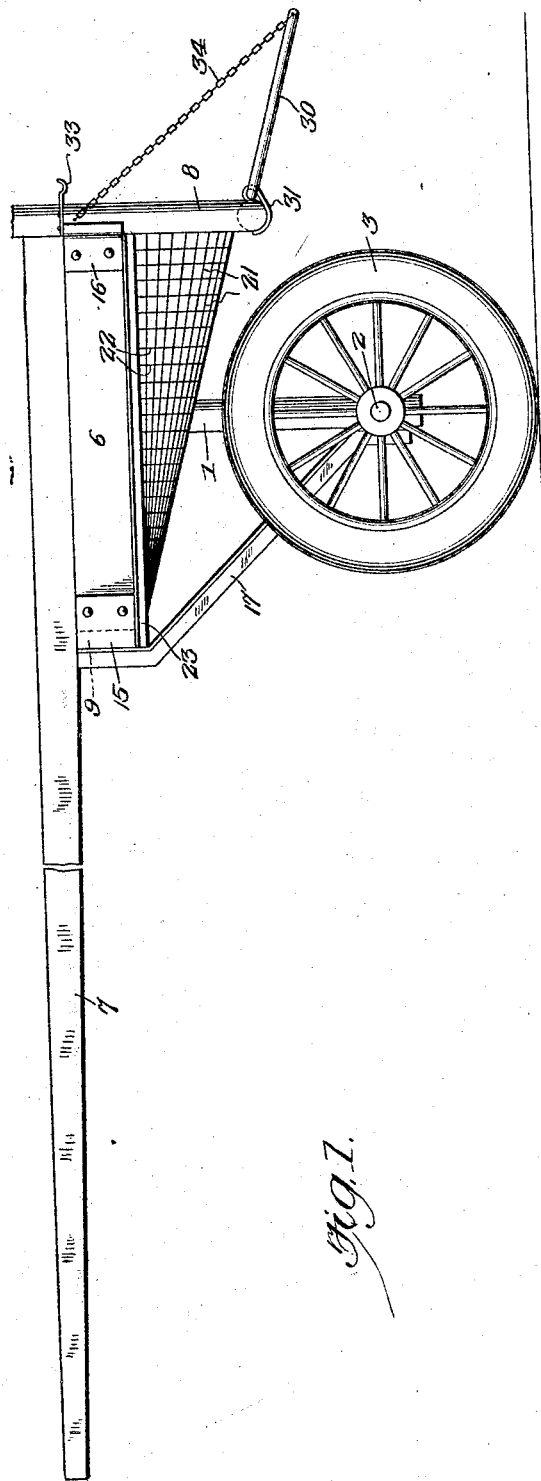
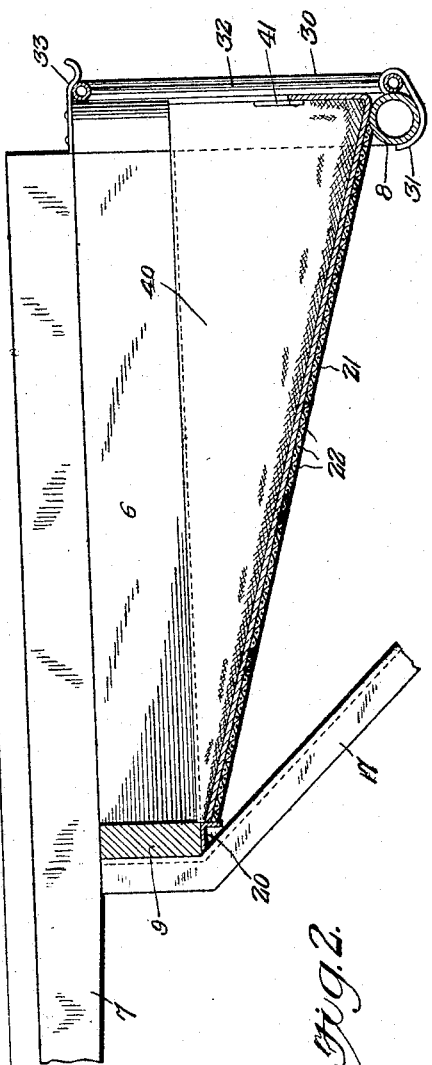
Inventor
William A. Cleghorn
By O'Neill & Bunn
Attorneys

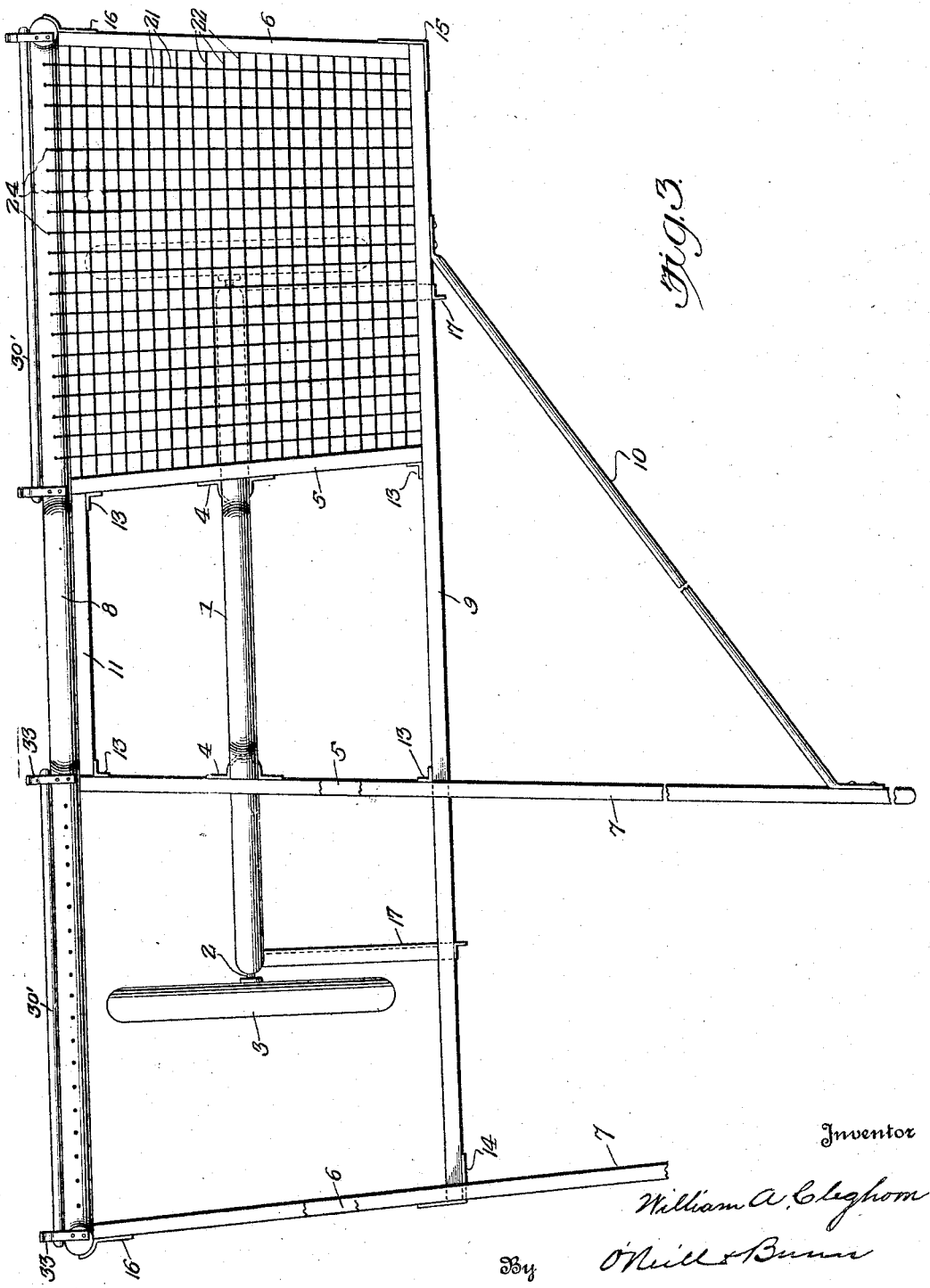

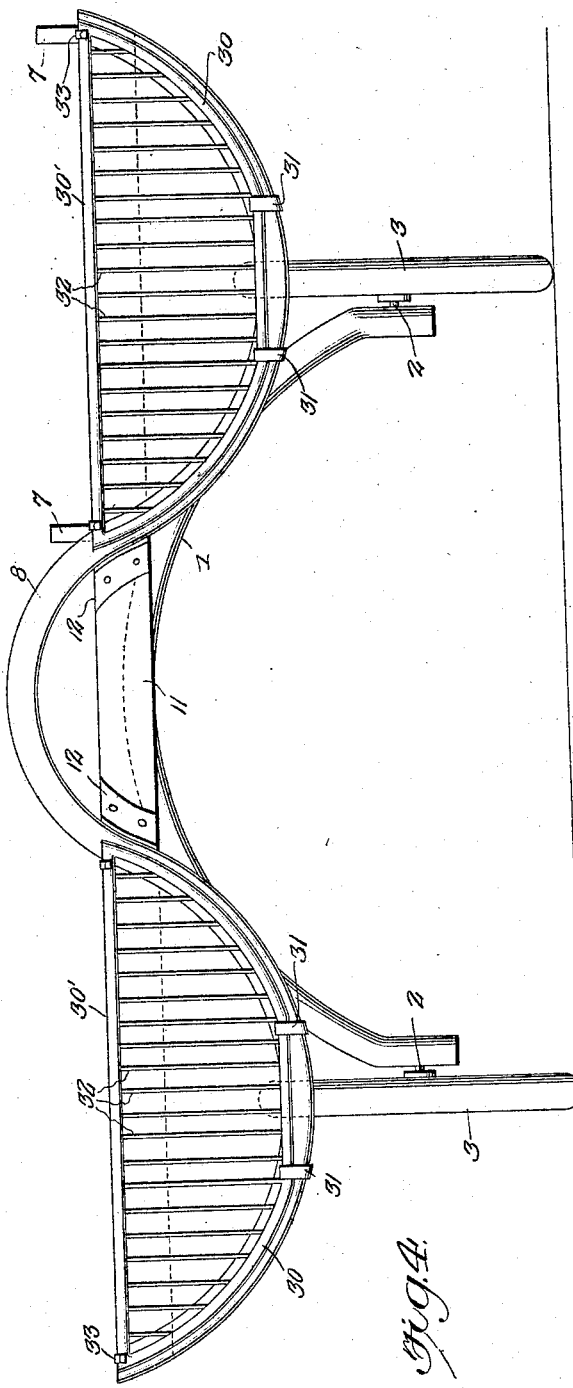

Patented Jan. 27, 1925.

1,524,339

UNITED STATES PATENT OFFICE.

WILLIAM ARTHUR CLEGHORN, OF WAIALUA, TERRITORY OF HAWAII, ASSIGNOR TO HAWAIIAN PINEAPPLE COMPANY, LIMITED, OF HONOLULU, TERRITORY OF HAWAII.

TRUCK.

Application filed February 27, 1924. Serial No. 695,564.

*To all whom it may concern:*

Be it known that I, WILLIAM ARTHUR CLEGHORN, a citizen of the United States, residing at Waialua, Oahu, Territory of Hawaii, have invented certain new and useful Improvements in Trucks; and I do hereby declare the following to be a full, clear, and exact description of the invention, such as will enable others skilled in the art to which it appertains to make and use the same.

My invention relates to improvements in trucks for harvesting or gathering fruit, vegetables and the like, such as are commonly grown in regular rows in fields, such, for example, as pineapples, and has for its objects to provide a wheeled truck adapted to straddle one or more rows of the growing plants with the wheels operating in spaces or furrows between adjacent rows, the body portion of the truck including two or more basket-like receptacles disposed on opposite sides of the vehicle, each receptacle sloping from the front to the rear and having a bottom section substantially straight at its front portion, and merging into an arcuate discharge end which is closed by a tail gate, the vehicle preferably being provided with shafts disposed at one side so that the draft animal may travel in the space between two rows.

The invention is illustrated in the accompanying drawings, in which:

Figure 1 is a side elevation of the vehicle.

Figure 2 is a longitudinal section through one of the body members.

Figure 3 is a plan view with the bottom of one of the body sections omitted, to more clearly illustrate the structural arrangement of the frame and the support therefor.

Figure 4 is a rear end elevation.

Figure 5 is a plan view of a canvas or similar cover for the bottom of each body section.

Referring to the drawings, 1 indicates a generally arch shaped supporting member, preferably formed of steel tubing, to the lower ends of which are welded two horizontal spindles 2, upon which are journaled the traction wheels 3, 3. The spread of the arch shaped member 1 should be sufficient to span or straddle one or two rows of the growing plants to be harvested, so that the wheels will run in the spaces between adjacent rows, and obviously the height of the arch should be sufficient to clear the tops of the plants.

The body of the vehicle is secured to the support or arch shaped member, said body portion including a fabricated frame comprising a horizontal front sill 9, extending the full width of the structure, and preferably formed of a wooden beam, and a rear sill 8 formed of metal tubing bent in the form of a triple bow, having an upwardly arched mid section and reverse bent arcuate end sections, the front and rear sills being connected by longitudinal wooden sills arranged in pairs, namely two end sills 6, 6 and two spaced intermediate sills 5, 5, which latter are secured by strips or stirrups 4, 4, embracing the arch shaped support 1 and having lateral flanges which are bolted to the side faces of the sills 5, 5. Connecting the rear ends of the sills 5, 5 and spanning the arch of the rear sill 8 is a bracing sill 11, which is secured to the adjacent face of the rear sill 8 by means of brackets 12 or L-irons, which are welded to the sill 8 and secured to the adjacent face of the sill 11 by bolts. The abutting portions of the front sill 9, the brace 11 and the longitudinal sills 5 are secured together by corner brackets 13. The joints between the ends of the front sill 9 and the end sills 6, 6 are braced by angle plates 14, 15 bolted to the respective members and the rear ends of the sills 6, are attached to the rear sill 8, by means of bracket members 16, each having a curved portion welded to the outer face of the sill 6. To apply the necessary strength and rigidity between the body and the supporting member 1 suitably formed struts 17 of L-iron are secured to the front sill 9 by bolts or similar fastenings, and welded at their lower ends to the lower portions of the arch shaped support 1.

The body portion of the vehicle is provided with two basket-like receptacles and defined by the spaces included between the front and rear sills 9 and 8, and each lateral pair of the longitudinal sills 5 and 6, each receptacle being completed by supplying a bottom, preferably formed of longitudinal wires 21 stretched between an L-bar section 20 secured to the under face of the front sill and the lateral bow or concaved section of the rear sill 8. These longitudinal wires may be conveniently secured to the front and rear sills by means of properly spaced holes in the L bar 20 and the upper surface of the tube 8 forming the rear sill, as illustrated in Figs. 2 and 3. Co-operating with the longitudinal wires 21, to form a substantially rigid bottom, are cross wires 22, which may be either interlaced with the longitudinal wires 21 or laid under the latter, the ends of the transverse wires being secured in spaced holes in angle iron strips fastened to the undersides of the sills 5 and 6. The bottom forms a straight line where it joins the front sill 9 and gradually merges into a deepening curve where it joins the rear sill 8, the mid section of the bottom being inclined as clearly illustrated in Figs. 1 and 2.

The rear or discharge end of each receptacle is closed by a tail gate, which preferably takes the form and structure illustrated, namely that of a segment of a circle generally conforming to the area defined by the corresponding bent portion of the rear sill 8. As illustrated, each tail gate comprises a frame made of rods or light pipe sections, comprising a bottom member 30 of general arch shape, the ends of which are united by a chord member 30', with light vertical bars or wires 32 secured between the members 30 and 30'. The gate is hinged to the corresponding rear sill section by means of strap like hinges 31, one end of which is welded to the surface of the rear sill and the other end bent into a loop or eye, which embraces the member 30 of the gate. Suitable latches 33 fastened to the rear sill serve to hold each gate in closed position. The gates are provided with suspension chains 34 attached to the chord 30' and to the rear sill, so that when the gates are opened they will stand at substantially the same inclination as the mid sections of the receptacles with which they co-operate, and the articles contained in the respective receptacles may be readily unloaded by sliding them over the inclined gates onto a platform or other receiving structure. In order to provide for an expeditious unloading for each receptacle and to avoid bruising or damaging the fruit or vegetables in the unloading operation, it is found preferable to provide each receptacle with a suitable lining, which is laid loosely over the bottom and completely covers the latter, as illustrated in Figs. 2 and 5. This lining may be constructed of canvas, cut to appropriate form, as shown in Fig. 5, the body 40 of which is provided on its rearward edge with beckets or handles 41. As illustrated in Fig. 2, the canvas cover for the bottom overlies the entire wire bottom and turns up for a short distance at the rear against the tail gate.

In operating the truck, as shown, it is moved by a draft animal, hitched to the shafts 7, extending longitudinally of the plant rows with the wheels running in the furrows or spaces between adjacent rows and the supporting arch like member 1 spanning one or more rows of plants. The attendants gathering the fruit or vegetables move along with the truck and deposit the gathered articles in the nearer basket-like receptacle until the truck is loaded. The vehicle is then drawn to the unloading point and the tail gates are unlatched and dropped to inclined position, and each of the canvas covers 40 overlying a bottom of a compartment or receptacle is grasped by the handles 41 and pulled backward, thereby withdrawing the entire load of fruit or the like from the vehicle at one operation and without bruising or otherwise damaging the goods, as is liable to be the case if the goods were dumped from the truck or permitted to slide out of the basket-like receptacles by gravity. In order to further reduce the liability of damaging the goods while the latter are being loaded on to the truck, and subsequently transported to the place of discharge, the two wheels of the truck are preferably provided with pneumatic tires which greatly reduce the shocks and jars which would be otherwise imparted to the moving vehicle, when the fields are rocky and uneven, or crossed by ditches or ridges.

What I claim is:

1. A truck comprising an arch shaped support; wheels mounted on the lower ends thereof; a body frame secured to said support including a horizontal front sill, a triple bowed rear sill having an upwardly arched mid section and reverse bend arcuate end sections, and two pairs of longitudinal sills conecting the front and rear sills with a space between the pairs; bottom sections extending from the arcuate end sections of the rear sill to the front sill and between each lateral pair of longitudinal sills and forming with said sills laterally spaced receptacles; and tail gates hinged to the rear sill to close the rears of said receptacles.

2. A harvesting truck comprising an arched supporting frame adapted to straddle a row of the product being harvested and provided with a carrier wheel on each side, a product receptacle mounted above each wheel, and equipped with a flexible bottom which is downwardly inclined from front to rear, and a relatively soft lining normally covering said bottom, and slidable thereon, substantially as described.

3. A truck comprising an arch shaped support; wheels mounted on the lower ends thereof; a body frame secured to said support including a horizontal front sill, two pairs of spaced longitudinal sills, and a rear sill having downwardly bowed end sections extending between the ends of the respective pairs of longitudinal sills, bottoms extending between the front sill and the bowed end sections of the rear sill and between each lateral pair of longitudinal sills forming with said sills separate laterally spaced transversely curved and rearwardly inclined receptacles; and tail gates hinged to the rear sill to close the rears of said receptacles.

4. A truck comprising an arch shaped support; wheels mounted on the lower ends thereof; a body frame secured to said support including a horizontal front sill, two pairs of spaced longitudinal sills, and a rear sill having downwardly bowed end sections extending between the ends of the respective pairs of longitudinal sills, bottoms extending between the front sill and the bowed end sections of the rear sill and between each lateral pair of longitudinal sills forming with said sills separate laterally spaced transversely curved and rearwardly inclined receptacles; tail gates hinged to the rear sill to close the rears of said receptacles; and a removable lining covering each bottom and adapted to be withdrawn with the load of each receptacle when the corresponding tail gate is opened.

In testimony whereof I affix my signature.

WILLIAM ARTHUR CLEGHORN.